(12) United States Patent
van Dijk et al.

(10) Patent No.: US 10,008,846 B2
(45) Date of Patent: Jun. 26, 2018

(54) CONTROL DEVICE FOR AN ELECTRONIC FUSE AND METHOD FOR CONTROLLING AN ELECTRONIC FUSE

(71) Applicant: NXP B.V., Eindhoven (NL)

(72) Inventors: Luc van Dijk, Kranenburg (DE); Holger Voelkel, Munich (DE); Thomas Gauter, Amberg (DE); Jan Falkenstein, Munich (DE)

(73) Assignee: NXP B.V., Eindhoven (NL)

(*) Notice: Subject to any disclaimer, the term of this patent is extended or adjusted under 35 U.S.C. 154(b) by 367 days.

(21) Appl. No.: 14/887,659

(22) Filed: Oct. 20, 2015

(65) Prior Publication Data

US 2017/0110874 A1    Apr. 20, 2017

(51) Int. Cl.
*H02H 3/08* (2006.01)
*H02H 3/087* (2006.01)

(52) U.S. Cl.
CPC ................... *H02H 3/087* (2013.01)

(58) Field of Classification Search
CPC ........................................................ H02H 3/087
See application file for complete search history.

(56) References Cited

U.S. PATENT DOCUMENTS

| 2011/0302437 A1* | 12/2011 | Haddab ................ H02H 7/18 713/323 |
| 2014/0167797 A1 | 6/2014 | Aerts |
| 2014/0285935 A1 | 9/2014 | Tsai et al. |

* cited by examiner

*Primary Examiner* — Scott Bauer
(74) *Attorney, Agent, or Firm* — Rajeev Madnawat

(57) ABSTRACT

Embodiments of a control device for an electronic fuse and a method for controlling an electronic fuse are described. Embodiments of a control device for an electronic fuse may include an interface configured to receive a current from a transistor device of the electronic fuse. Additionally, the control device may further include a sense-and-control device coupled to the interface and configured to detect an increase in the current received at the interface under a standby mode of the electronic fuse and to output an interrupt signal in response to the increase in the current received at the interface.

20 Claims, 4 Drawing Sheets

CONTROL DEVICE FOR AN ELECTRONIC FUSE AND METHOD FOR CONTROLLING AN ELECTRONIC FUSE

BACKGROUND

A fuse can be used for overcurrent protection of a circuit device and a cable. A fuse can be used in various applications, including automotive applications. For example, a fuse can be used with a current source or a current load to prevent current overage of the current source or the current load.

SUMMARY

Embodiments of a control device for an electronic fuse and a method for controlling an electronic fuse are described. Embodiments of a control device for an electronic fuse may include an interface configured to receive a current from a transistor device of the electronic fuse. Additionally, the control device may include a sense-and-control device coupled to the interface and configured to detect an increase in the current received at the interface under a standby mode of the electronic fuse and to output an interrupt signal in response to the increase in the current received at the interface.

In an embodiment, a control device for an electronic fuse implemented in a vehicle includes an interface configured to receive a current from a metal-oxide semiconductor field-effect transistor (MOSFET) device of the electronic fuse, wherein the current is generated by a battery unit of the vehicle and a sense-and-control device coupled to the interface and configured to detect an increase in the current received at the interface under a standby mode of the electronic fuse and to output an interrupt signal in response to the increase in the current received at the interface.

In an embodiment, a method for controlling an electronic fuse involves receiving a current from a transistor device of the electronic fuse and detecting an increase in the current received at the interface under a standby mode of the electronic fuse and outputting an interrupt signal in response to the increase in the current received at the interface.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Fuses can be used for overcurrent protection of circuit devices. However, power consumption by fuses can be substantially large under standby mode. In order to maintain a certain level of efficiency, it is desirable to providing overcurrent protection without causing substantial power losses.

Figure 1:
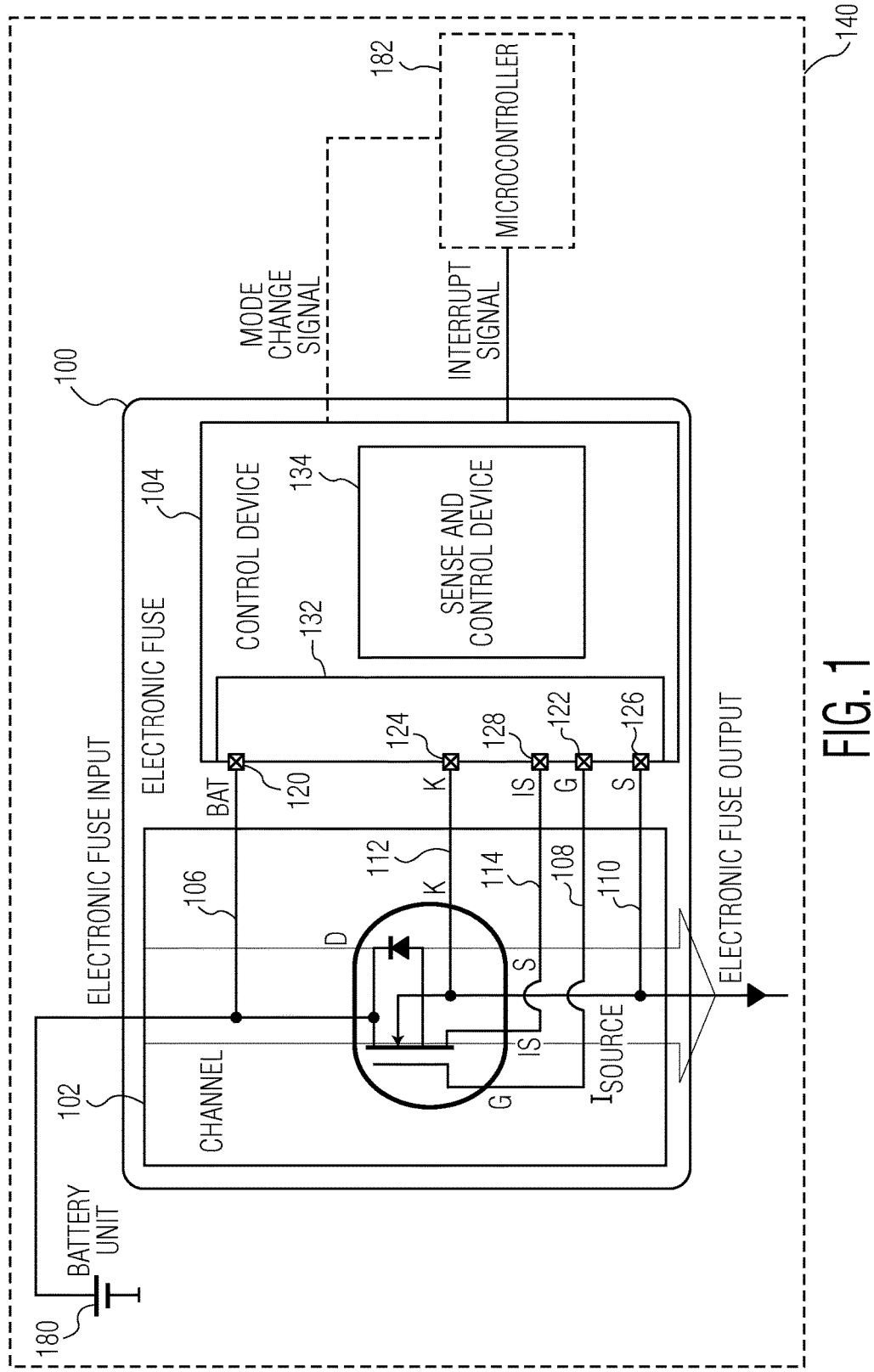
FIG. 1 depicts a schematic circuit diagram of one embodiment of an electronic fuse.

FIG. 1 depicts a schematic block diagram of an electronic fuse 100 in accordance with an embodiment of the invention. In the embodiment depicted in FIG. 1, the electronic fuse includes a transistor device 102 and a control device 104. The electronic fuse can be used in various applications. In some embodiments, the electronic fuse can be used in an automotive application to protect an automotive device, such as a bus controller, from current overage. For example, the electronic fuse can be used to prevent current and voltage overage from a battery unit 180. In some embodiments, the electronic fuse is included in an electronic system such as a vehicle 140, which includes the battery unit. The electronic fuse can be implemented as a standalone device or integrated into a fuse system. In one embodiment, the electronic fuse is implemented in an integrated circuit.

The transistor device 102 of the electronic fuse 100 includes a drain node 106, a gate node 108, a source node 110, a Kelvin node 112, and a sense current node 114. The transistor device is used to conduct a current, which can be generated by the battery unit 180 of the vehicle 140.

Figure 2:
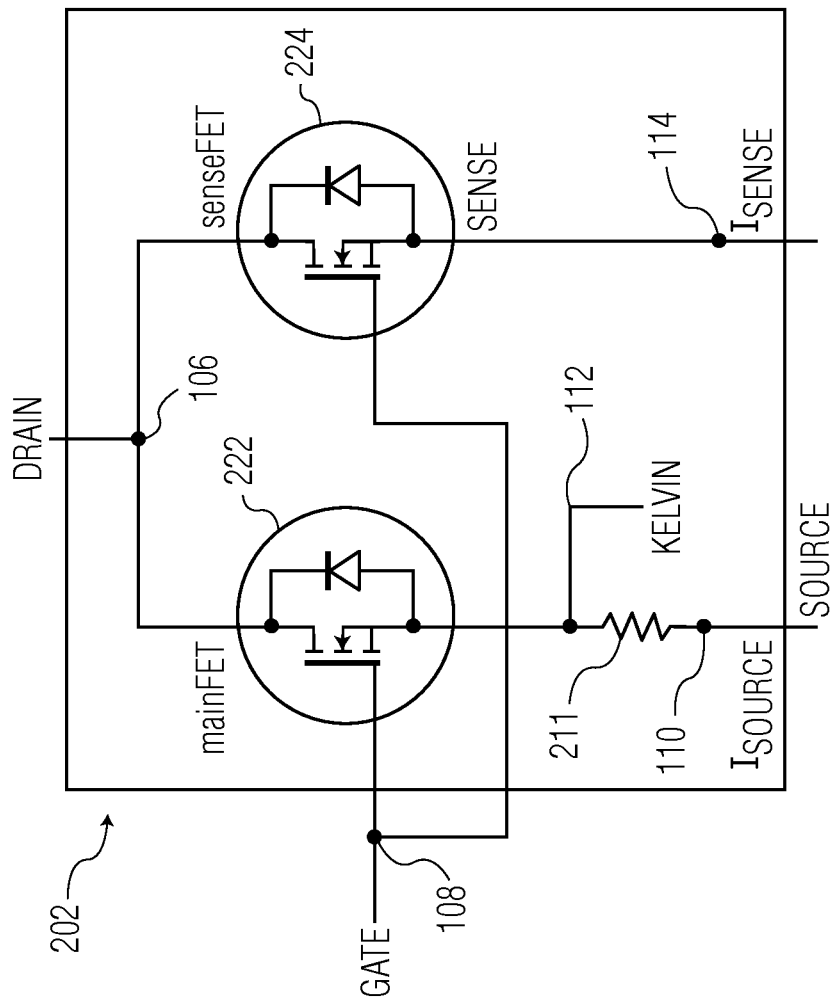
FIG. 2 depicts a schematic block diagram of an embodiment of a transistor device of the electronic fuse depicted in FIG. 1.

FIG. 2 depicts a schematic circuit diagram of one embodiment of the transistor device 102 of the electronic fuse 100 depicted in FIG. 1. In the embodiment depicted in FIG. 2, a transistor device 202 includes a main transistor 222 with a source bondwire 211 and a sense transistor 224. In an embodiment, the transistor device is configured to conduct a main current ($I_{SOURCE}$) as illustrated in FIG. 1. The main transistor may be, for example, a MOSFET device. In a further embodiment, the main transistor may be a power MOSFET configured to conduct high currents for automotive applications. The sense transistor may also be a MOSFET device. In an embodiment, the main transistor and the sense transistor may be integrated into a transistor device package as illustrated by the transistor device 102 in FIG. 1.

In the embodiment depicted in FIG. 2, the main transistor 222 and the sense transistor 224 are each connected to the drain node (D) 106 and the gate node (G) 108. In an embodiment, the main transistor includes the Kelvin node (K) 112 for providing an accurate measurement of the potential at the source node 110 of the main transistor. Additionally, the sense transistor may provide a sense current to the sense current node 114.

In some embodiments, the main transistor 222 is configured to conduct a current ($I_{SOURCE}$) and the sense transistor 224 is configured to provide a measurable sense current ($I_{SENSE}$), which may be a portion of the current ($I_{SOURCE}$), for external sensing. In some embodiments, the sense transistor may be configured to provide a sense current that is smaller than the main current by a predetermined ratio. For example, the ratio may be determined by the relative size of the main transistor and the sense transistor. If, for example, the main transistor is n times larger than the sense transistor, the sense transistor may be configured to provide the sense current $I_{SENSE}$ that is $1/n^{th}$ of the main current $I_{SOURCE}$.

Turning back to FIG. 1, the control device 104 of the electronic fuse 100 includes an interface 132 configured to receive a current from the transistor device 102 of the electronic fuse. In the embodiment depicted in FIG. 1, the interface includes a battery terminal/pin 120, a gate terminal/pin 122, a Kelvin terminal/pin 124, a source terminal/pin 126 and a sense current terminal/pin 128, each configured to be respectively coupled to the drain node 106, the gate node 108, the Kelvin node 112, the source node 110, and the sense current node 114 of the transistor device, respectively. In an embodiment, the control device may be a stand-alone integrated circuit device having I/O pins corresponding to the battery terminal/pin, the gate terminal/pin, the source terminal/pin, the Kelvin terminal/pin, and the sense current terminal/pin.

In addition, the control device 104 of the electronic fuse 100 also includes a sense-and-control device 134 coupled to the interface 132 and configured to detect an increase in the current received at the interface under the standby mode of the electronic fuse and to output an interrupt signal in response to the increase in the current received at the interface. Using the sense-and-control device to detect the current increase so as to trigger an interrupt signal under the standby mode of the electronic fuse, the electronic fuse can perform fast and accurate detection of large current increase and current bypassing (i.e., supplying the load) under standby mode. For example, the interrupt signal can be used by a microcontroller 182, which can cause the electronic fuse to change from the standby mode to the active mode (e.g., using a mode change signal). Under the active mode, the electronic fuse can perform fast detection and current bypassing when an overcurrent is detected in under standby mode.

Figure 3:
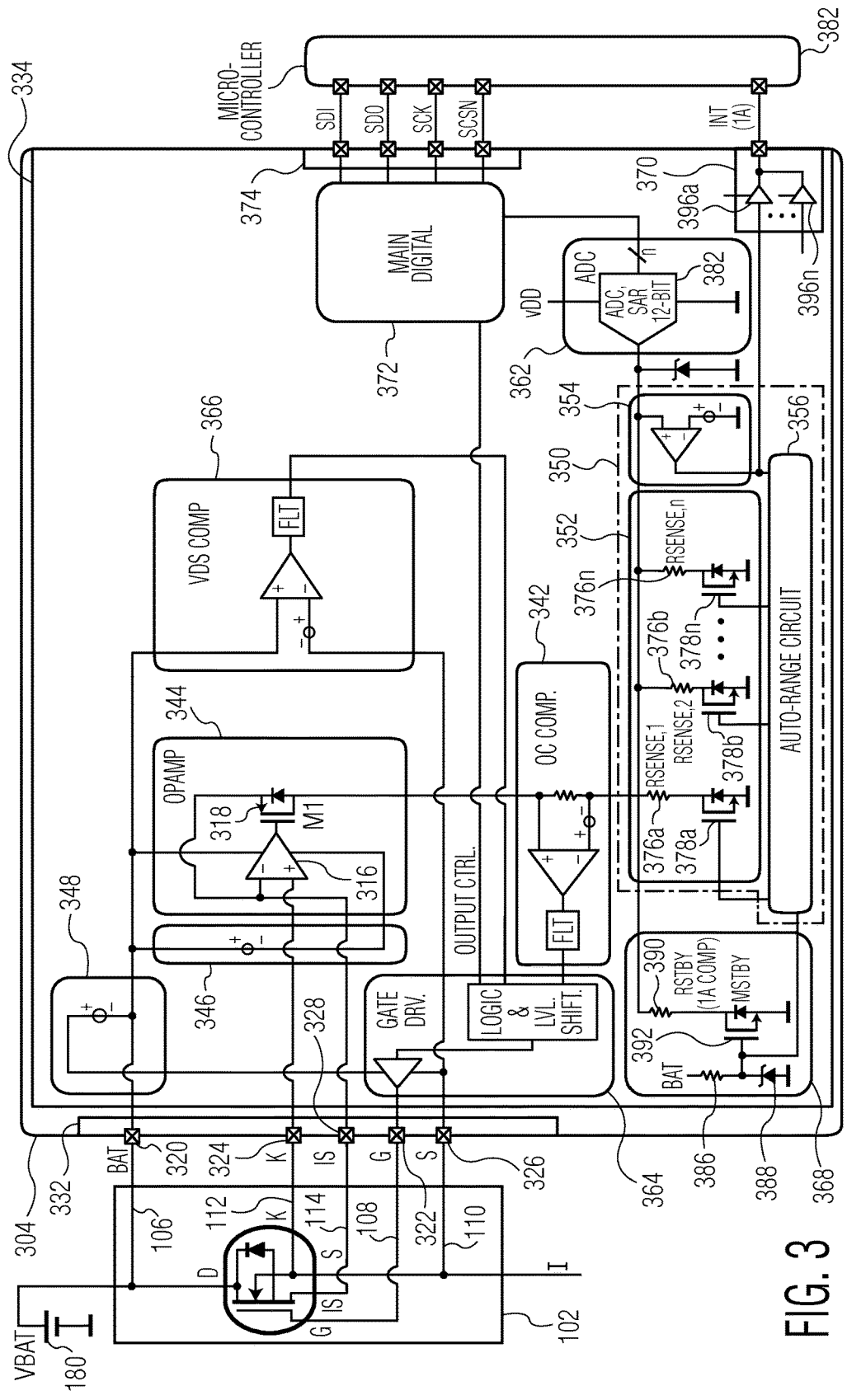
FIG. 3 depicts an embodiment of the electronic fuse depicted in FIG. 1.

FIG. 3 depicts a schematic block diagram of an embodiment of the electronic fuse 100 depicted in FIG. 1. In the embodiment depicted in FIG. 3, an electronic fuse 300 includes the transistor device 102 and a control device 304. The electronic fuse 300 depicted in FIG. 3 is one possible embodiment of the electronic fuse 100 depicted in FIG. 1. However, the electronic fuse 100 depicted in FIG. 1 is not limited to the embodiment shown in FIG. 3.

The control device 304 of the electronic fuse 300 includes an interface 332 configured to receive a current from the transistor device 102 of the electronic fuse. In the embodiment depicted in FIG. 3, the interface includes a battery terminal/pin 320, a gate terminal/pin 322, a Kelvin terminal/pin 324, a source terminal/pin 326 and a sense current terminal/pin 328, each configured to be respectively coupled to the drain node 106, the gate node 108, the Kelvin node 112, the source node 110 and the sense current node 114 of the transistor device, respectively. The battery terminal/pin 320, the gate terminal/pin 322, the Kelvin terminal/pin 324, the source terminal/pin 326 and the sense current terminal/pin 328 depicted in FIG. 3 may be the same as or similar to the battery terminal/pin 120, the gate terminal/pin 122, the Kelvin terminal/pin 124, the source terminal/pin 126 and the sense current terminal/pin 128 depicted in FIG. 1, respectively.

In addition, the control device 304 of the electronic fuse 300 includes a sense-and-control device 334 configured to detect an increase in the current received at the interface 332 under the standby mode of the electronic fuse and to output an interrupt signal in response to the increase in the current received at the interface. In the embodiment depicted in FIG. 3, the sense-and-control device includes an Overcurrent Comparator (OC Comp) 342, an operational amplifier (OPAMP) 344, a voltage source 346, a Charge Pump (CP) 348, a sense control circuit 350, which in turn includes a sensor component 352, a reference comparator 354 and an auto-range circuit 356, a current sensing block 362, a gate driver 364, a Vds comparator 366, a current to voltage converter 368, an output interface 370, a main digital block 372, and a microcontroller interface 374. Although the illustrated sense-and-control device is shown with certain components and described with certain functionality herein, other embodiments of the sense-and-control device may include fewer or more components to implement the same, less, or more functionality.

In the embodiment depicted in FIG. 3, the OPAMP 344 is configured to force the voltage on the Kelvin terminal 324 and the sense current terminal 328 to be equal, such that the main transistor 222 and the sense transistor 224 (shown in FIG. 2) operate on the same gate-source voltage difference. Because Gate-source voltages of the main transistor and the sense transistor are equal, a current n times smaller than the current that flows through the main transistor will flow through the sense transistor, when the sense transistor is n times smaller than the main device 102, and is sensed in the sense-and-control device. In the OPAMP, the sense current flows through transistor (M1) 318. A supply voltage, which is generated by the voltage source 346, is supplied to the OPAMP.

The Charge Pump (CP) 348 of the sense-and-control device 334 is configured to provide a voltage supply for the transistor device, which may include one or more NMOSFET devices configured to operate in a high-side configuration. In a high-side configuration, the gate voltage may be larger than the supply voltage (battery voltage, VBAT), which is generated by the charge pump. The Overcurrent Comparator (OC Comp) 342 of the sense-and-control device is configured to detect an overcurrent that is larger than the nominal current range. The OC Comp is also enabled under standby mode of the electronic fuse.

The sense control circuit 350 of the sense-and-control device 334 includes the sensor component 352, the reference comparator 354 and the auto-range circuit 356. The sensor component, which may be activated and deactivated periodically, includes sense resistors 376a-376n (Rsense,1, . . . , Rsense,n) and switch transistors 378a-378n. In an operation, the OPAMP 304 forces the voltage levels at the Kelvin terminal 324 and the sense current interface 328 to be equal. The sense current may be n times smaller than the main current (I), and may flow to ground via sense resistors 376a-376n (Rsense,1, . . . n) in the sensor component. In such an embodiment, the voltage level across the sense resistor(s) in the sensor component may be significantly higher than the voltage level across other component in the electronic fuse of FIG. 3. In such an embodiment, the sense-and-control device may be less sensitive to EMC exposure. In some embodiments, the sense control circuit 350 configures the sensor component 352 such that the resistance of the sensor component is adjusted in value depending on the absolute value of the current (I) and the sense current (I/n). Such an embodiment, with adjustable resistance, will allow the measurement over a wide current range with high accuracy and resolution. For example, the reference comparator 354 may be configured to compare the output voltage of the sensor component to a reference voltage and provide feedback to the auto-range circuit 356. In one embodiment, the voltage may be 1.8 V. One of ordinary skill, however, will recognize other suitable reference voltages that may be used. The auto-range circuit may then cause another sense resistor 376a, . . . , or 376n in the sensor component to be activated. For example, the auto-range circuit may apply a voltage to the switch transistor 378a, . . . , or 378n causing current to flow through the corresponding sense resistor.

In an exemplary operation of the sense control circuit 350, a sense current is received at the sense current terminal 328 and conducted through transistor 318 (M1) to the sensor component 352. A first switch transistor 378a is activated, causing the current to flow through the corresponding first sense resistor 376a. The reference comparator 354 compares the voltage across the first sense resistor 376a with the reference voltage and determines that the voltage on the first sense resistor 376a is too high. In response, a feedback signal is sent to sense control circuit, which causes auto-range circuit 356 to deactivate the first switch transistor 378a and activate the second switch transistor 378b. Activating the second switch transistor 378b causes the current to flow through the second sense resistor 376b, which may have a different resistance value than the first sense resistor 376a. Thus, the resistance value of the sensor component 302 is automatically adjusted or scaled according to the value of the current received at the sense current terminal 328. In an alternative embodiment, the switch transistors 378a, . . . , 378n is activated in parallel, rather than in sequence.

The gate driver 364 of the sense-and-control device 334 is configured to drive the gate node 108 of the transistor device 102. The current sensing block 362 of the sense-and-control device, which includes an Analog-to-Digital Converter (ADC) 363, is configured to convert a current sense voltage into digital sensor data that can be used by external digital components, such as a microcontroller 382. The Vds comparator 366 is configured to detect large drain-source voltage (Vds) between the drain node 106 and the source node 110 of the transistor device that cannot be detected by the OC Comparator 342.

In the embodiment depicted in FIG. 3, digital sensor outputs of the gate driver 364 and the current sensing block 362 are input into the main digital block 372. The main digital block may reformat the digital sensor signals for communication to the microcontroller. In some embodiments, the main digital block outputs reformatted sensor signals to the microcontroller through the microcontroller interface 374, which may be a Serial Peripheral Interface (SPI) bus interface with multiple discrete lines, such as SPI data input (SDI), SPI data output (SDO), SPI clock input (SCK), and SPI slave chip select (SCSN).

Compared to a conventional fuse that acts as a sacrificial device that melts when large current flows through it to protect a corresponding circuit device, the electronic fuse 300 continuously senses the current going through the transistor device 102, and consequently, consumes current under standby mode. The standby current consumption of the electronic fuse is defined as the total current (excluding the channel current in the direction from the battery unit 180 to the transistor device 102) flowing from the battery unit to the transistor device and the control device 304 under the standby mode. The electronic fuse solves the trade-off between accurately measuring overcurrent under standby mode while still consuming low standby current, as described in details below. The electronic fuse can perform accurate current measurement of fuse channel currents under standby mode. In addition, the electronic fuse can perform fast detection of large current increase (while still below overcurrent trip level) under standby mode. Further, the electronic fuse can perform fast detection and current bypassing when an overcurrent is detected under standby mode.

In the embodiment depicted in FIG. 3, the electronic fuse 300 can reduce standby current by performing accurate current measurements periodically. Consequently, the large current that is consumed during the accurate current measurement is averaged over time and an overall low standby current consumption is achieved. In some embodiments, the microcontroller 382 periodically wakes up the electronic fuse (e.g., the OPAMP 344, the reference comparator 354, the auto-range circuit 356, and the current sensing block 362 of the electronic fuse) in order to perform an accurate channel current measurement.

In addition, the electronic fuse 300 can detect an overcurrent of the transistor device 102 through the interface 332 and open the electronic fuse (i.e., not conducting) in case of the overcurrent. In the embodiment depicted in FIG. 3, the OC Comp 342 and the gate driver 364 detect an overcurrent and open the electronic fuse in case of the overcurrent. Because of the low current consumption of the OC Comp, the electronic fuse consumes low standby current.

Further, the electronic fuse 300 can realize the fast detection of steep current increase. In the embodiment depicted in FIG. 3, the electronic fuse includes the current to voltage converter 368 configured to compare the current received at the interface 332 with a current threshold and to generate an interrupt signal based on a comparison between the current received at the interface and the current threshold and the output interface 370 configured to output the interrupt signal to the microcontroller 382 to cause the electronic fuse to change from the standby mode to an active mode. The current to voltage converter may be a dedicated inaccurate comparator that trips at a fairly low channel current level (e.g. around 1 A or any other suitable current level). The inaccurate comparator may be always enabled under standby mode. The current to voltage converter is used to detect an increase of the current received through the interface 332 while the received current is still below the trip level. The inaccurate comparator can signal an interrupt to the microcontroller, which then performs an accurate channel current measurement. Because of the low accuracy, the inaccurate comparator can run at a low standby current. In some embodiments, an interrupt is generated by the current to voltage converter 368 and the reference comparator 354 and is transmitted to the external microcontroller 382 via the output interface 370. In some embodiments, the output interface is a combined pin for all four channels of the microcontroller. In these embodiments, the microcontroller initially does not know which channel triggered the interrupt, but can retrieve that information via an interrupt status register through a Serial Peripheral Interface (SPI).

In the embodiment depicted in FIG. 3, the current to voltage converter 368 includes a first zener diode 388, a first resistor "Rstby" 390, and a transistor "Mstby" 392. These components of the current to voltage converter realize a "depletion" transistor, an alternative solution to a depletion device, which is desired because the output signal of the auto-range circuit 356 may not be present in standby mode. A second resistor 386 of the current to voltage converter converts the sensed current to a voltage that is fed to the reference comparator 354, which will trip (trigger an output signal) when the sensed current exceeds a pre-defined level (e.g. around 1 A or any other suitable current level). The output signal of the reference comparator is connected to the input to the output interface 370, which includes output drivers 396a, . . . , 396n, where n is a positive integer that is larger than 2. The output signal of the output interface 370 might be connected to the microcontroller 382 in order to generate an interrupt.

Figure 4:
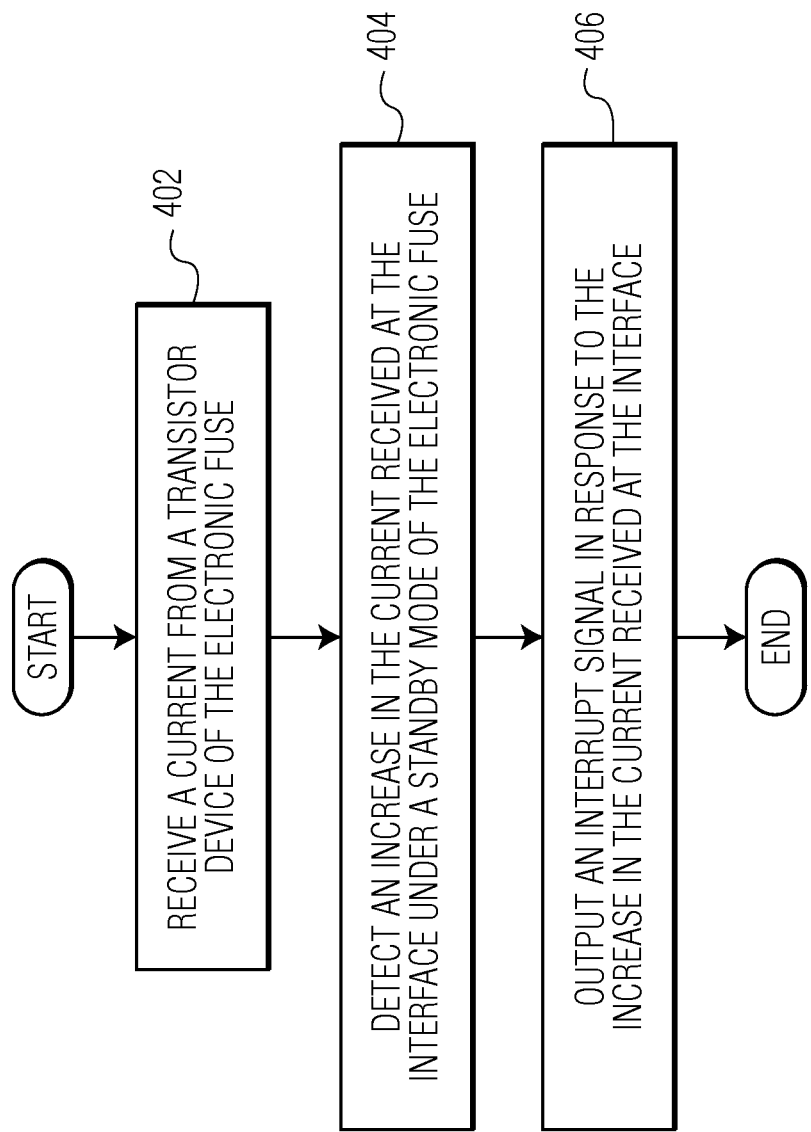
FIG. 4 depicts a flowchart diagram illustrating an embodiment of a method for controlling an electronic fuse.

FIG. 4 depicts a flowchart diagram of one embodiment of a method controlling an electronic fuse. At block 402, a current is received from a transistor device of the electronic fuse. At block 404, an increase in the current received at the interface under a standby mode of the electronic fuse is detected. At block 406, an interrupt signal is outputted in response to the increase in the current received at the interface. The electronic fuse may be the same as or similar to the electronic fuse 100 depicted in FIG. 1 and/or the electronic fuse 300 depicted in FIG. 3.

It should also be noted that at least some of the operations for the methods described herein may be implemented using firmware or software instructions stored on a readable storage medium for execution by a programmable logic device, such as an Application Specific Integrated Circuit (ASIC), a Field Programmable Gate Array (FPGA), a Programmable Logic Chip (PLC), a processor, or the like. As an example, an embodiment of a program product includes a firmware package stored on a flash memory device and configured to cause an FPGA to perform the operations described herein.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A control device for an electronic fuse, comprising:
   an interface configured to receive a current from a transistor device of the electronic fuse; and
   a sense-and-control device coupled to the interface and configured to detect an increase in the current received at the interface under a standby mode of the electronic fuse and to output an interrupt signal in response to the increase in the current received at the interface to put the electronic fuse in active mode, wherein the electronic fuse is configured to perform fast current detection in the active mode.

2. The control device of claim 1, wherein the sense-and-control device comprises a current to voltage converter configured to compare the current received at the interface with a current threshold and to generate the interrupt signal based on a comparison between the current received at the interface and the current threshold.

3. The control device of claim 2, wherein the sense-and-control device comprises an output interface configured to output the interrupt signal to cause the electronic fuse to change from the standby mode to an active mode.

4. The control device of claim 3, wherein the sense-and-control device further comprises an adjustable resistance device, a resistance value of the adjustable resistance device being selectable in response to a level of the current received at the interface.

5. The control device of claim 4, wherein the sense-and-control device further comprises an automatic ranging device configured to automatically scale the resistance value of the adjustable resistance device in response to a magnitude value of the current.

6. The control device of claim 5, wherein the sense-and-control device further comprises a comparator configured to trigger an adjustment of the adjustable resistance component in response to the current received at the interface.

7. The control device of claim 6, wherein the interface comprises:
   a gate node interface configured interface with a gate node of the transistor device;
   a drain node interface configured to interface with a drain node of the transistor device;
   a source node interface configured to interface with a source node of the transistor device;
   a Kelvin node interface configured to interface with a Kelvin node of the transistor device; and
   a sense current node interface configured to receive the current from a sense current node of the transistor device, the current being a sense current that is smaller than a main current that flows through the transistor device by a predetermined ratio.

8. The control device of claim 7, further comprising an Operational Amplifier (OPAMP) coupled to the sense node interface and the Kelvin node interface and configured to force a voltage value at the sense node interface and at the Kelvin node interface to equal levels.

9. An electronic fuse comprises the interface, the transistor device and the sense-and-control device of claim 1.

10. A control device for an electronic fuse implemented in a vehicle, comprising:
an interface configured to receive a current from a MOSFET device of the electronic fuse, wherein the current is generated by a battery unit of the vehicle; and
a sense-and-control device coupled to the interface and configured to detect an increase in the current received at the interface under a standby mode of the electronic fuse and to output an interrupt signal in response to the increase in the current received at the interface to put the electronic fuse in active mode, wherein the electric fuse is configured to perform fast current detection in the active mode.

11. The control device of claim 10, wherein the sense-and-control device comprises a current to voltage converter configured to compare the current received at the interface with a current threshold and to generate the interrupt signal based on a comparison between the current received at the interface and the current threshold.

12. The control device of claim 11, wherein the sense-and-control device comprises an output interface configured to output the interrupt signal to a microcontroller of the vehicle, which causes the electronic fuse to change from the standby mode to an active mode.

13. The control device of claim 12, wherein the sense-and-control device further comprises an adjustable resistance device, a resistance value of the adjustable resistance device being selectable in response to a level of the current received at the interface.

14. The control device of claim 13, wherein the sense-and-control device further comprises an automatic ranging device configured to automatically scale the resistance value of the adjustable resistance device in response to a magnitude value of the current.

15. The control device of claim 14, wherein the sense-and-control device further comprises a comparator configured to trigger an adjustment of the adjustable resistance component in response to the current received at the interface.

16. The control device of claim 15, wherein the interface comprises:
a gate node interface configured interface with a gate node of the MOSFET device;
a drain node interface configured to interface with a drain node of the MOSFET device;
a source node interface configured to interface with a source node of the MOSFET device;
a Kelvin node interface configured to interface with a Kelvin node of the MOSFET device; and
a sense current node interface configured to receive the current from a sense current node of the MOSFET device, the current being a sense current that is smaller than a main current that flows through the MOSFET device by a predetermined ratio.

17. The control device of claim 16, further comprising an Operational Amplifier (OPAMP) coupled to the sense node interface and the Kelvin node interface and configured to force a voltage value at the sense node interface and at the Kelvin node interface to equal levels.

18. A method for controlling an electronic fuse, the method comprising:
receiving a current from a transistor device of the electronic fuse; and
detecting an increase in the current received at the interface under a standby mode of the electronic fuse; and
outputting an interrupt signal in response to the increase in the current received at the interface to put the electronic fuse in active mode, wherein the electronic fuse is configured to perform fast current detection in the active mode.

19. The method of claim 18, further comprising comparing the current received at the interface with a current threshold and generating the interrupt signal based on a comparison between the current received at the interface and the current threshold.

20. The method of claim 19, further comprising outputting the interrupt signal to cause the electronic fuse to change from the standby mode to an active mode.

* * * * *